United States Patent
Smith

(10) Patent No.: US 11,347,742 B2
(45) Date of Patent: *May 31, 2022

(54) QUERYING ACROSS A COMPOSITE JOIN OF MULTIPLE DATABASE TABLES USING A SEARCH ENGINE INDEX

(71) Applicant: ServiceNow, Inc., Santa Clara, CA (US)

(72) Inventor: Timothy Smith, Newton, MA (US)

(73) Assignee: ServiceNow, Inc., Santa Clara, CA (US)

( * ) Notice: Subject to any disclaimer, the term of this patent is extended or adjusted under 35 U.S.C. 154(b) by 295 days.

This patent is subject to a terminal disclaimer.

(21) Appl. No.: 16/594,641

(22) Filed: Oct. 7, 2019

(65) Prior Publication Data

US 2020/0142892 A1    May 7, 2020

Related U.S. Application Data

(63) Continuation of application No. 15/545,295, filed as application No. PCT/US2016/014383 on Jan. 21, 2016, now Pat. No. 10,437,824, which is a continuation-in-part of application No. 14/604,590, filed on Jan. 23, 2015, now Pat. No. 9,275,155.

(51) Int. Cl.
　　*G06F 16/00*　　(2019.01)
　　*G06F 16/2455*　　(2019.01)
　　*G06F 16/951*　　(2019.01)
　　*G06F 16/22*　　(2019.01)

(52) U.S. Cl.
　　CPC ...... *G06F 16/2456* (2019.01); *G06F 16/2237* (2019.01); *G06F 16/951* (2019.01)

(58) Field of Classification Search
None
See application file for complete search history.

(56) References Cited

U.S. PATENT DOCUMENTS

| | | |
|---|---|---|
| 6,321,229 B1 | 11/2001 | Goldman |
| 6,609,122 B1 | 8/2003 | Ensor |
| 6,678,887 B1 | 1/2004 | Hallman |
| 6,799,189 B2 | 9/2004 | Huxoll |
| 6,816,898 B1 | 11/2004 | Scarpelli |
| 6,895,586 B1 | 5/2005 | Brasher |
| 7,020,706 B2 | 3/2006 | Cates |
| 7,027,411 B1 | 4/2006 | Pulsipher |
| 7,028,301 B2 | 4/2006 | Ding |

(Continued)

*Primary Examiner* — Anhtai V Tran
(74) *Attorney, Agent, or Firm* — Fletcher Yoder PC

(57) ABSTRACT

A computer system executes a user-supplied query across multiple relational database tables linked by a common key. A new query form, called a composite join, takes a user-supplied query including one or more terms optionally joined by logical operations, an identification of two or more tables and an identification of a common join key shared across the tables. The composite join applies the query across the tables such that any of the query terms can be matched by any of the tables. A query is performed across all tables for each query term and any join keys associated with matching records from the tables are identified in a set of join keys associated with the respective term. The logical operations are then performed on the resulting sets of join keys to combine the results of the term queries according to the user query.

20 Claims, 7 Drawing Sheets

(56) References Cited

U.S. PATENT DOCUMENTS

| | | | |
|---|---|---|---|
| 7,062,683 B2 | 6/2006 | Warpenburg | |
| 7,131,037 B1 | 10/2006 | LeFaive | |
| 7,170,864 B2 | 1/2007 | Matharu | |
| 7,392,300 B2 | 6/2008 | Anantharangachar | |
| 7,610,512 B2 | 10/2009 | Gerber | |
| 7,617,073 B2 | 11/2009 | Trinon | |
| 7,685,167 B2 | 3/2010 | Mueller | |
| 7,689,628 B2 | 3/2010 | Garg | |
| 7,716,353 B2 | 5/2010 | Golovinsky | |
| 7,769,718 B2 | 8/2010 | Murley | |
| 7,783,744 B2 | 8/2010 | Garg | |
| 7,890,802 B2 | 2/2011 | Gerber | |
| 7,925,981 B2 | 4/2011 | Pourheidar | |
| 7,930,396 B2 | 4/2011 | Trinon | |
| 7,933,927 B2 | 4/2011 | Dee | |
| 7,945,860 B2 | 5/2011 | Vambenepe | |
| 7,966,398 B2 | 6/2011 | Wiles | |
| 8,051,164 B2 | 11/2011 | Peuter | |
| 8,073,840 B2 * | 12/2011 | Smith | G06F 16/2456 707/714 |
| 8,082,222 B2 | 12/2011 | Rangarajan | |
| 8,224,683 B2 | 7/2012 | Manos | |
| 8,266,096 B2 | 9/2012 | Navarrete | |
| 8,380,645 B2 | 2/2013 | Kowalski | |
| 8,402,127 B2 | 3/2013 | Solin | |
| 8,457,928 B2 | 6/2013 | Dang | |
| 8,478,569 B2 | 7/2013 | Scarpelli | |
| 8,554,750 B2 | 10/2013 | Rangaranjan | |
| 8,612,408 B2 | 12/2013 | Trinon | |
| 8,646,093 B2 | 2/2014 | Myers | |
| 8,674,992 B2 | 3/2014 | Poston | |
| 8,689,241 B2 | 4/2014 | Naik | |
| 8,643,121 B2 | 6/2014 | De Peuter | |
| 8,745,040 B2 | 6/2014 | Kowalski | |
| 8,812,539 B2 | 8/2014 | Milousheff | |
| 8,818,994 B2 | 8/2014 | Kowalski | |
| 8,832,652 B2 | 9/2014 | Mueller | |
| 8,887,133 B2 | 11/2014 | Behnia | |
| 8,983,982 B2 | 3/2015 | Rangarajan | |
| 9,015,188 B2 | 4/2015 | Behne | |
| 9,037,536 B2 | 5/2015 | Vos | |
| 9,065,783 B2 | 6/2015 | Ding | |
| 9,098,322 B2 | 8/2015 | Apte | |
| 9,122,552 B2 | 9/2015 | Whitney | |
| 9,137,115 B2 | 9/2015 | Mayfield | |
| 9,239,857 B2 | 1/2016 | Trinon | |
| 9,317,327 B2 | 4/2016 | Apte | |
| 9,323,801 B2 | 4/2016 | Morozov | |
| 9,363,252 B2 | 6/2016 | Mueller | |
| 9,412,084 B2 | 9/2016 | Kowalski | |
| 9,467,344 B2 | 10/2016 | Gere | |
| 9,508,051 B2 | 11/2016 | Falk | |
| 9,535,674 B2 | 1/2017 | Cooper | |
| 9,535,737 B2 | 1/2017 | Joy | |
| 9,557,969 B2 | 1/2017 | Sharma | |
| 9,613,070 B2 | 4/2017 | Kumar | |
| 9,645,833 B2 | 5/2017 | Mueller | |
| 9,654,473 B2 | 5/2017 | Miller | |
| 9,659,051 B2 | 5/2017 | Hutchins | |
| 9,766,935 B2 | 9/2017 | Kelkar | |
| 9,792,387 B2 | 10/2017 | George | |
| 9,805,322 B2 | 10/2017 | Kelkar | |
| 9,852,165 B2 | 12/2017 | Morozov | |
| 10,002,203 B2 | 6/2018 | George | |
| 2006/0004840 A1 * | 1/2006 | Senda | G06F 16/2272 |
| 2014/0108460 A1 * | 4/2014 | Casella dos Santos | G06F 16/284 707/794 |

\* cited by examiner

QUERYING ACROSS A COMPOSITE JOIN OF MULTIPLE DATABASE TABLES USING A SEARCH ENGINE INDEX

RELATED APPLICATIONS

The subject matter of this application is related to U.S. Pat. No. 10,437,824, filed 2017 Jul. 20, which is a national phase of Patent Cooperation Treaty Application PCT/US2016/014383, filed on 2016 Jan. 21, which claims priority to U.S. Pat. No. 9,275,155, filed on 2015 Jan. 23, all of which applications are incorporated herein by reference in their entireties.

BACKGROUND OF THE INVENTION

Relational databases provide substantial advantages when it comes storing and managing structured data. Unfortunately, database design techniques that are aimed at reducing data redundancy and enforcing data normalization rules typically do not support full-text indexing and querying of text documents as do modern search engines. When it comes to searching within structured data relational databases can impose significant constraints on a user's ability to query. Queries performed on a relational database can be exceedingly complex and frequently are beyond the skillset of the novice or untrained user. Relational databases also lack the simplicity of the one line search interface to which users of web search engines have become accustomed.

For example, the World Wide Web can provide access to a vast amount of information, and specialized search tools, known as "search engines" (e.g., Google, Yahoo, and MSN Search) have achieved great success in facilitating searching of static text documents. Conventional web-based search engines, however, are not designed for use in an enterprise environment because data can be stored in many different forms, using various localized repositories and databases. While a data repository on the Internet or an intranet may contain record-based data relevant to a search query, the search engine may not be capable of indexing and/or accessing the data. A similar problem may be encountered with other forms of content such as word-processing documents, graphical or image files, MP3 clips, interactive blogs, and other data that may change in real time.

Conventional methods of executing a query referencing multiple tables in a search engine tend to fall into one of two categories: (i) denormalization, in which the joined tables must be combined at index time, or (ii) subdivision, where the query is divided into two or more table queries, which are processed independently, and the results combined in a post-processing phase. Denormalization has several drawbacks, primarily the increase in the size of the index, because tables with multiple foreign keys can expand by orders of magnitude after denormalization. The post-processing approach involves extracting a large volume of data from the index (typically the entire contents of one or more tables) and then winnowing the data down based on the join constraints. This is also an inefficient use of resources.

U.S. Pat. No. 8,073,840, assigned to the assignee of the present application, titled "Querying joined data within a search engine index," and which is incorporated herein by reference in its entirety, provides techniques and systems for using a search engine interface to index and retrieve data and documents stored in a relational database management system (RDBMS).

SUMMARY OF THE INVENTION

This Summary is provided to introduce a selection of concepts in a simplified form that are further described below in the Detailed Description. This Summary is intended neither to identify key or essential features, nor to limit the scope, of the claimed subject matter.

A computer system executes a user-supplied query across multiple relational database tables linked by a common foreign key. A new query form, called a composite join, takes a user-supplied query including one or more terms optionally joined by logical operations, an identification of two or more tables, and an identification of a common join key shared across the tables. The composite join applies the query across the tables such that any of the query terms can be matched by any of the tables. In one embodiment a query is performed across all tables for each query term and any join keys associated with matching records from the tables are identified in a set of join keys associated with the respective term. The logical operations are then performed on the resulting sets of join keys to combine the results of the term queries according to the user query. The result of the logical operations produces a matching set of join keys, which in turn is used to identify matching table records. In one embodiment, a bitset is used to represent the presence of join keys within a set such that logical operations can be performed efficiently using bitwise arithmetic.

DETAILED DESCRIPTION

Figure 1:
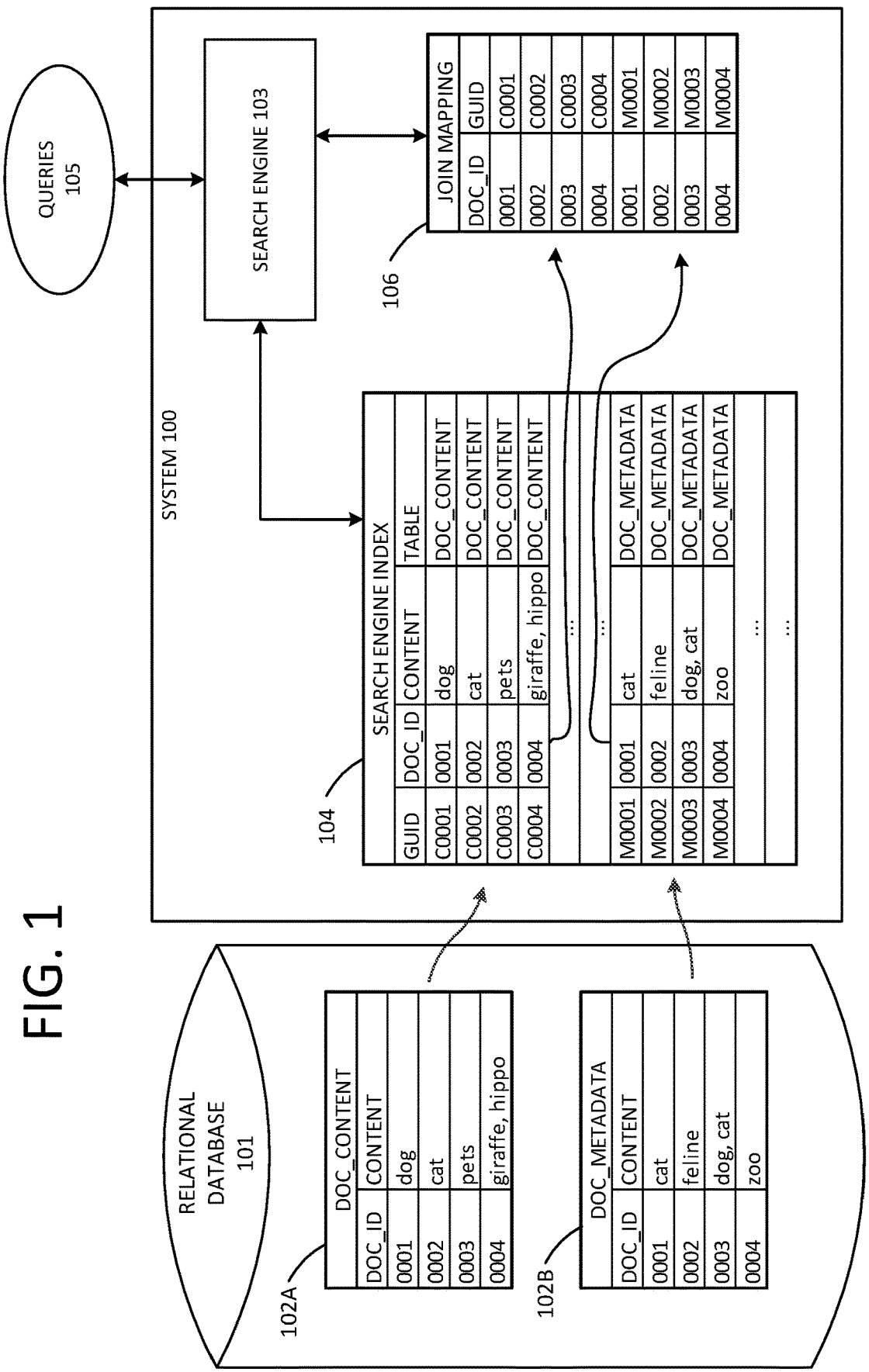
FIG. 1 is a diagram of a system including relational database tables that have been ingested into a search engine index.

In the following description, reference is made to the accompanying drawings, which form a part hereof, and which show, by way of illustration, specific embodiments or processes in which the invention may be practiced. Where possible, the same reference numbers are used throughout the drawings to refer to the same or like components. In some instances, numerous specific details are set forth in order to provide a thorough understanding of the present invention. The present invention, however, may be practiced without the specific details or with certain alternative equivalent devices and methods to those described herein. In other instances, well-known methods and devices have not been described in detail so as not to unnecessarily obscure aspects of the present invention.

Suppose a user wants to run complex Boolean queries against fields in two or more relational database tables, e.g. tables TABLE_ONE and TABLE_TWO as if the separate fields from the two or more tables were logically in a single field of a single table. For example, consider a query "AND(a, b)", which should match against the records of the tables in any of the following cases:

1. TABLE_ONE record contains "a" and TABLE_TWO record contains "b"

2. TABLE_TWO record contains "a" and TABLE_ONE record contains "b"
3. TABLE_ONE record contains "a" and "b"
4. TABLE_TWO record contains "a" and "b"

If this query were formatted in SQL and run against CONTENT fields in both tables sharing a field DOCID, it might be written as follows:

SELECT * FROM TABLE_ONE INNER JOIN TABLE_TWO ON TABLE_ONE.DOCID = TABLE_TWO.DOCID

WHERE
TABLE_ONE.CONTENT='a' AND TABLE_TWO.CONTENT='b' OR
TABLE_TWO.CONTENT='a' AND TABLE_ONE.CONTENT='b' OR
TABLE_ONE.CONTENT='a' AND TABLE_ONE.CONTENT='b' OR
TABLE_TWO.CONTENT='a' AND TABLE_TWO.CONTENT='b';

As the Boolean queries become more complex and as more tables are added, the number of possible combinations that need to be OR'd together also increase. In the above example, four combinations of possibilities were needed in the SQL statement to test all possibilities. A query AND(a, b,c) run across three tables would involve 27 different combinations that would need to be tested. More complex queries can become correspondingly expensive to execute in terms of compute resources.

In accordance with one embodiment, a computer system executes a user-supplied query across multiple relational database tables linked by a common foreign key. A new query form, called a composite join, takes a user-supplied query including one or more terms optionally joined by logical operations, an identification of two or more tables, and an identification of a common join key shared across the tables. The composite join applies the query across the tables such that any of the query terms can be matched by any of the tables.

In one embodiment, a query is performed across all tables for each query term and any join keys associated with matching records from the tables are identified in a set of join keys associated with the respective term. The logical operations are then performed on the resulting sets of join keys to combine the results of the term queries according to the user query. The result of the logical operations produces a matching set of join keys, which in turn is used to identify matching table records. In one embodiment, a bitset is used to represent the presence of join keys within a set such that logical operations can be performed efficiently using bitwise arithmetic.

Referring to FIG. 1, a system 100 provides a search engine interface for the processing of queries 105 against data from a relational database 101. The relational database 101 can, for example, include two tables 102A and 102B. The contents of the tables 102A and 102B are ingested by a search engine 103 and indexed in a search engine index 104. The search engine 103 associates a globally unique identifier (GUID) with each record of each database table that is taken into the index 104. For each GUID, the search engine 103 also can store in the index 104 a set of (field, value) pairs for the fields and values of the corresponding record in the relational database 101. Along with (field, value) pairs for a GUID, the index 104 preferably also includes a "table" field that is paired with the name of the relational database table from which the corresponding record was obtained. Using this search engine index 104, the search engine 103 can handle certain types of queries 105 against the relational database 101 much more efficiently than would be possible with traditional SQL queries applied directly against the relational database 101.

Relational database tables 102A and 102B, for example, include data from a collection of text documents where each text document is split up into two records. A record containing the content of the text document is stored in a field called CONTENT in a first table e.g. DOC_CONTENT 102A. Any metadata fields relating to the text document (such as author name, date, keywords and abstract) are contained in a CONTENT field in a second table e.g. DOC_METADATA 102B. Tables 102A and 102B in FIG. 1 also show a common field, DOC_ID, which serves as an identifier of the text document and a foreign key by way of which the data in these two tables are related. Although not shown, the tables 102A and 102B will generally contain several other fields, such as a primary key field, as well as other data fields, such as "author name," "date," "keywords" and "abstract" in the case of the metadata table and a "text" field containing the complete text of the text document in the case of the content table. In the case of the tables 102A and 102B, these tables are related by way of the foreign key DOC_ID, which is contained in both tables.

For the purposes of the present example, the CONTENT field in the tables 102A and 102B can be understood to contain an aggregate of the text in all the text fields of a record. It may often be the case that the relational database table from which a record was obtained does not contain a "content" field. In this case, the search engine 103 can create a "content" field in the index 104 and populate its value with an aggregation of the data from all of the other fields indexed. Accordingly, in the example at hand, the source relational database tables 102A and 102B need not contain a CONTENT field at all in order to support searching across all fields using the search engine index. The search engine 103 can use known indexing techniques on the fields that are ingested in order to expedite searching over those fields using the index 104.

A join mapping 106 associates the DOC_ID foreign key values of the tables 102A and 102B with their respective GUIDs in the search index. Join mappings are described in detail in U.S. Pat. No. 8,073,840, assigned to the assignee of the present application, the entirety of which is incorporated herein by reference. The DOC_ID field will be referred to as the "join key" field for this join mapping as it is the foreign key based upon which the tables 102A and 102B can be joined. The join mapping 106 preferably subsists within the data of the search engine index 104 by way of the indexed data of the DOC_ID field and the GUID field. If a join mapping is not already present within the search engine index 104, the search engine 103 can create the needed join mapping on demand.

Figure 2:
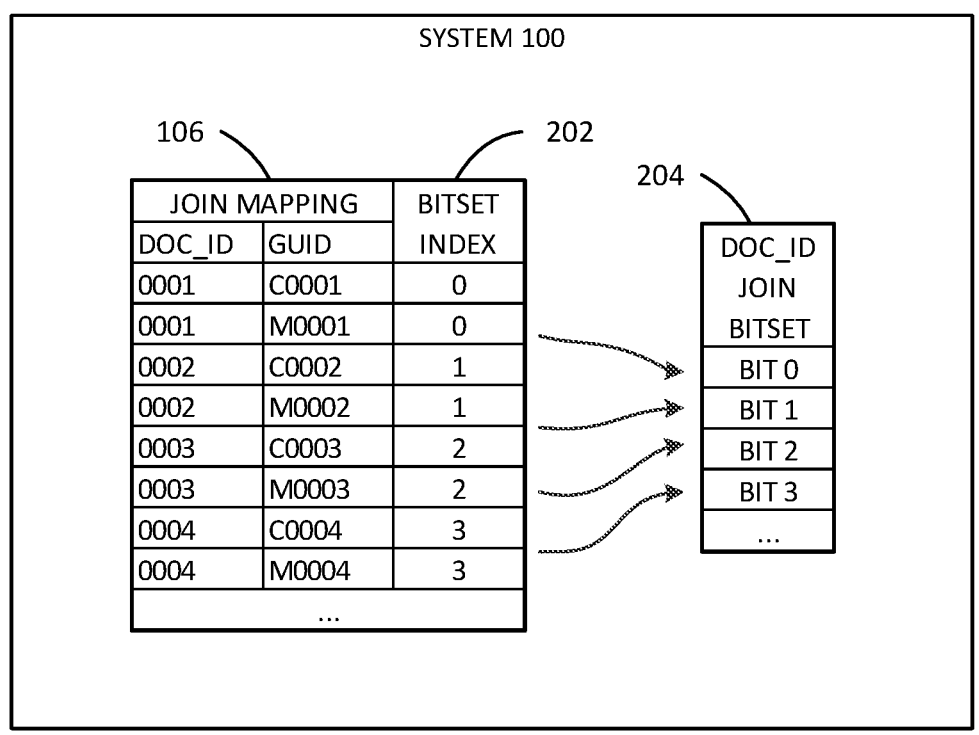
FIG. 2 is a graphical illustration showing a relationship between a join mapping, a bitset index and ordinal positions within a join bitset.

Referring to FIG. 2, the join mapping 106 is sorted on the DOC_ID join key field. This sort can be handled by the nature of the DOC_ID join key field being an indexed field in the index 104. In association with the indexing of the DOC_ID field, an ordinal index number is associated with each unique value of the DOC_ID join key field. This set of ordinal index numbers, referred to as a bitset index 202, is used as an index into a bitset 204 that can efficiently represent the presence of individual DOC_ID values in query results. The unique ordinal index associated with each DOC_ID join key field represents the position within a bitset 204 associated with a DOC_ID join key. A "1" value in the bitset 204 can be used to represent the presence of the bit position's corresponding join key in a query result while a "0" value in the bitset 204 can be used to represent the absence of the bit position's corresponding join key in a query result. The bitset 204 provides an efficient mechanism for combining the results of multiple queries that share the same join key.

The bitset index 204 is distinct from the known database concept of a bitmap index. A database bitmap index can be used to efficiently store and use field index data by associating individual records with bit positions in a bitmap index. A database bitmap index can significantly improve single query performance for low-cardinality fields. The bitset index 204, however, associates unique field values, not individual records, with bit positions in the bitset, which in turn provides increased performance when combining the results of multiple queries.

Figure 3:
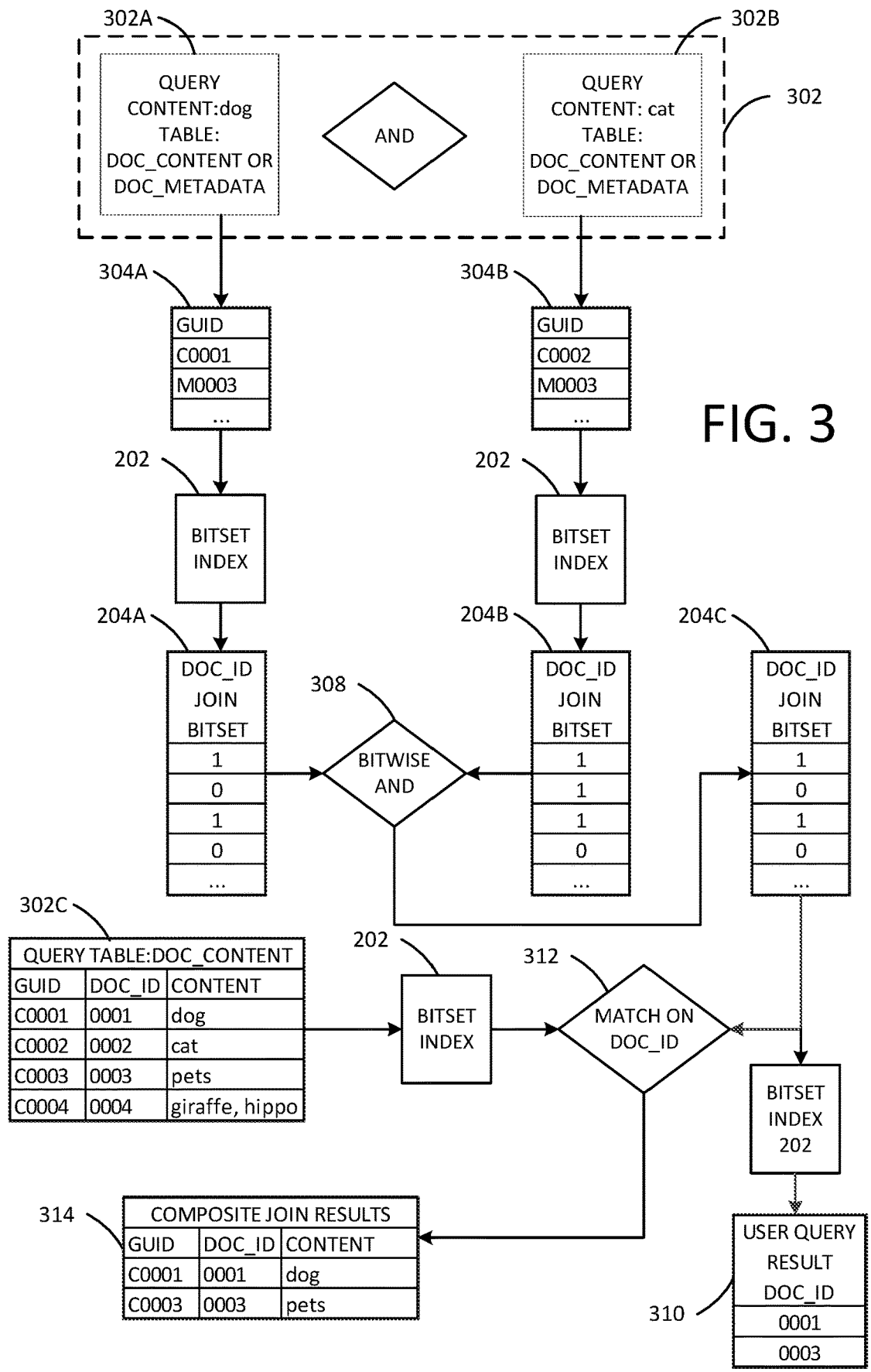
FIG. 3 is a diagram showing an example implementation of a composite join in accordance with one embodiment.

FIG. 3 shows an example use case of how a composite join can be implemented in accordance with one embodiment using the data and tables in FIGS. 1 and 2. Suppose a user wants to use the search engine index to identify all records in the DOC_CONTENT table where a user query of AND(dog, cat) matches across the CONTENT fields of both the DOC_CONTENT and DOC_METADATA tables. In this case, the DOC_CONTENT and DOC_METADATA tables are related by the DOC_ID join field. This query against the search engine index 104 can be expressed, for example, as the following composite join:

```
COMPOSITEJOIN(AND(CONTENT:dog, CONTENT:cat),
   FROM(TABLE:DOC_CONTENT),
   OUTER(TABLE:DOC_METADATA), on="DOC_ID")
```

In this composite join example, the term "AND(CONTENT:dog, CONTENT:cat)" specifies the user query that the search engine 103 will apply across multiple tables. The term "CONTENT:" indicates for each of "dog" and "cat" that these terms must be found in the "CONTENT" field of a table. The "AND" operator specifies that both CONTENT:dog and CONTENT:cat must be found, but each term could be present independently of the other for matching records in any of the searched tables. So the term "dog" could be found in a matching record of one table while the term "cat" could be found in a corresponding record in another table. The term "FROM(TABLE:DOC_CONTENT)" indicates that the matching records produced by the query will all be from the table DOC_CONTENT and that the "CONTENT" field of the DOC_CONTENT table will be searched for matches or partial matches to the user query. The term "OUTER(TABLE:DOC_METADATA)" indicates that the "CONTENT" field of the DOC_METADATA also will be searched for matches or partial matches to the user query, but the notation "OUTER" indicates that there need not be a corresponding record present in the DOC_METADATA table in order for a DOC_CONTENT record to match. Therefore, a DOC_CONTENT record fully satisfying the "AND(CONTENT:dog, CONTENT:cat)" user query with no corresponding record in the DOC_METADATA table could match the composite join query. Had the term "OUTER" instead been specified as "INNER", a DOC_CONTENT record satisfying the "AND(CONTENT:dog, CONTENT:cat)" composite query would require that a corresponding record in the DOC_METADATA at least exist in order for the DOC_CONTENT record to match the composite join query. The 'on="DOC_ID"' term indicates that the DOC_ID field is the join field upon which the specified tables are being joined to identify corresponding records in the two tables. In accordance with one embodiment, each of the tables included in the composite join will include the join field.

Referring now to FIG. 3, in order to execute the composite join query 302, the search engine 103 parses the user query "AND(CONTENT:dog, CONTENT:cat)" into two unitary queries to "dog" 302A and to "cat" 302B that are effectively ANDed together in accordance with the "AND" operation of the user query. The search engine 103 then executes the unitary queries against the search engine index 104 across all the tables in the composite join. A first unitary query 302A produces all records in the search engine index matching CONTENT:dog within the DOC_CONTENT or DOC_METADATA tables. A second unitary query 302B produces all records in the search engine index matching CONTENT:cat within the DOC_CONTENT or DOC_METADATA tables. For each of the unitary queries 302A and 302B, the search engine 103 obtains from the index 104 a set of GUIDs 304A and 304B that identify the matching records.

In order to combine the results 304A and 304B of the unitary queries, the resulting GUIDs from each of the unitary queries need to be matched up with corresponding GUIDs in the other query that have an identical DOC_ID join key. To do this in an efficient manner the search engine 103 maps the GUIDs using the join mapping 106 and bitset index 202, to bits in join bitsets 204A and 204B. The search engine 103 associates the ordinal index locations of individual bits in the bitsets, through the join mapping 106 and bitset index 202, with values for the join keys that correspond to the GUIDs. The presence of a join key associated with a GUID in a result can be indicated by setting the corresponding bit, according to the join mapping 106 and bitset index 202 to a "1." In this manner, the join bitsets 204A and 204B identify the DOC_ID join field values that correspond to the results of the unitary queries 302A and 302B.

The join bitsets 204A and 204B provide an efficient platform upon which to perform additional operations on the results of the queries 304A and 304B. In this example, the user query specifies an AND operation associating the query terms CONTENT:dog and CONTENT:cat. The search engine 103 effects this AND operation by performing a bitwise AND operation 308 on the resulting join bitsets 204A and 204B to produce a resulting join bitset 204C. The join bitset 204C identifies, by the ordinal locations of all of its "1" bits, all the DOC_ID join keys that match the user query across both the tables in the composite join. In accordance with one embodiment, the search engine 103 can also map the join bitset 204C back through the bitset index 202 to identify the actual DOC_ID join field values 310 matching the user query.

In order to identify matching records within the DOC_CONTENT table (as specified by FROM(TABLE:DOC_CONTENT)), the search engine 103 executes a query 302C against the index 104 to identify all records in the DOC_CONTENT table. The search engine 103 then filters the results of this FROM table query 302C for matching results by mapping the DOC_ID join field of the 302C query's records to bits in the join bitset 204C using the bitset index 202. The value of the bit in the join bitset 204C associated with each query record 302C indicates whether to include the record. The output of this filter produces a result set of records 314 from the search engine index that match the user query across the composite query's tables.

In accordance with one embodiment, a process similar to that depicted in FIG. 3 can be used to perform an inner or outer join, distinct from a composite join. In this embodiment, the unitary queries 302A and 302B of FIG. 3 would be replaced by any valid queries that could be processed by the search engine. The queries in this embodiment, distinct from the composite join, are applied against the search engine generally, and not limited to a specific set of tables as would be specified in a composite join. Accordingly, each of the queries can independently specify any tables against which it is to be run and the two queries can specify completely disjoint sets of tables. To perform an inner join, the bitwise AND 308 would remain a bitwise AND. To perform an outer join, the bitwise AND, however, would be replaced by a bitwise OR. Otherwise, the process depicted in FIG. 3 remains similar for an inner or outer join embodiment.

Figure 4:
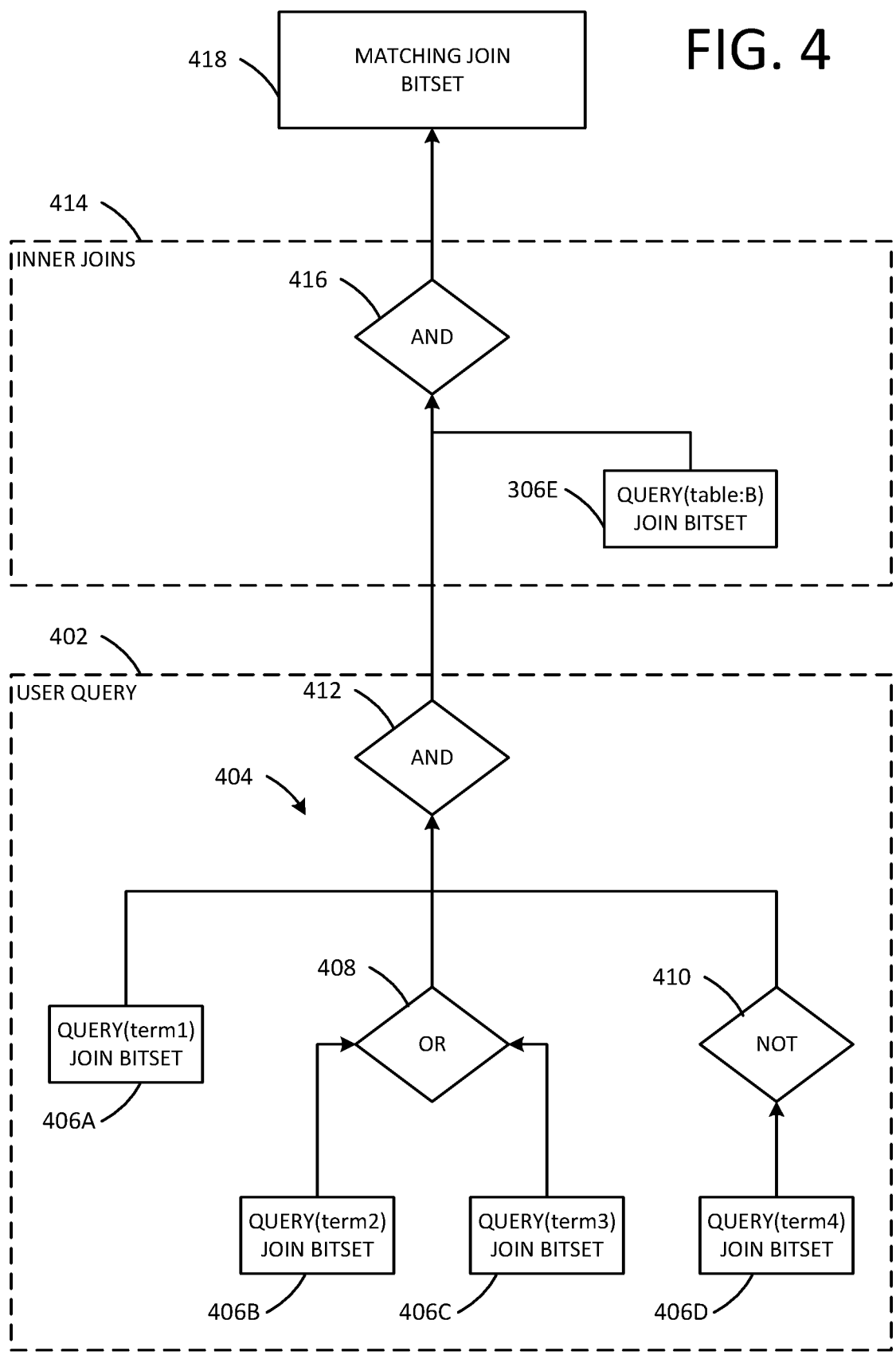
FIG. 4 is a diagram of a Boolean query tree constructed for an example query in accordance with one embodiment.

Referring to FIG. 4, an example of a more complex composite join query will now be explained. The composite join operation can efficiently handle user queries of unlimited complexity constructed from logical operations applied to unitary queries. The composite join can also efficiently handle a query across a large numbers of tables. Consider, for example, the following composite query:

---
COMPOSITEJOIN(AND(term1, OR(term2, term3), NOT(term4)), FROM(table:A), INNER(table:B), OUTER(table:C), on=joinid)

---

In this example, the user query "AND(term1, OR(term2, term3), NOT(term4))" includes four unitary queries, "term1" through "term4," which are joined together using the logical operations AND, OR and NOT. The user query is applied across the tables A, B and C, all joined by the join key "joinid." Matching records will be produced from table A, but the user query can be satisfied across the corresponding records of all of tables A, B and C. Note that since the table B is included by way of an INNER join, any matching record of table A must have a corresponding record present in table B with the same joinid key. Since table C is included by way of an outer join, there is no requirement that it contain a record corresponding to a matching record of table A.

The search engine 103 parses the user query 402 using known parsing techniques to create a Boolean query tree 404, as illustrated in FIG. 4. The search engine creates the Boolean query tree 404 in a data structure in computer memory that the search engine 103 can then process to perform the operations specified by the nodes represented in the tree. In accordance with one embodiment, the search engine 103 parses any logical operations, such as AND, OR and NOT operations, until only unitary queries remain. The unitary queries populate the leaves of the Boolean tree, while the logical operations occupy the nodes above the leaves. The unitary queries are preferably field queries on terms or phrases, such as "content:dog" or 'content:"golden retriever".' In one embodiment, a unitary query can be any legal query that could otherwise be processed by the search engine 103.

Once the search engine 103 identifies the unitary queries, it executes them against the search engine index 104 to identify sets of matching join keys, which can be represented by join bitsets 406A-D. The search engine 103 creates the join bitsets 406A-D in a manner similar to the join bitsets 204A and 204B discussed above with reference to FIG. 3. Once the join bitsets 406A-D are created, the search engine 103 operates upon and/or combines them using bitwise operations according to the logical operations specified in the Boolean query tree. In the example, the search engine combines the bitsets 406B and 406C corresponding to term2 and term3 respectively using a logical bitwise OR operation 408. The search engine 103 applies a bitwise NOT 410 to bitset 406D corresponding to term4. The search engine 103 then applies a bitwise AND 412 to the join bitset 306A, which corresponds to term1, to combine it with the former two bitset results. In this manner, the bitwise AND 412 produces a join bitset that represents the "joinid" keys matching the user query from records within the joined tables A-C.

In order to account for the inner join 414 on table B, the search engine 103 applies a query for table:B against the search engine index to produce a join bitset 306E. This join bitset 306E identifies all "joinid" keys within the records of table B. The search engine 103 then applies a bitwise AND 416 to the join bitset 306E and the output of the bitwise AND 412 in order to filter out all matches from the AND 412 that do not contain a corresponding record in table B. The result is a matching join bitset 416, analogous to the bitset 204C above. In order to identify matching records within the "FROM" table A, the search engine performs a query to identify all records from table A. As explained above with reference to the composite join results 314, the search engine 103 then filters the resulting records from table A against the matching the join bitset the 416 on the "joinid" join key field to identify matching records from table A.

To vary the foregoing example, if a user specified additional tables as inner join tables, as opposed to outer join tables in the composite join, those additional tables would also be queried for and bitwise joined in at the AND 416. So, for example, had table C been specified as an inner join it would also have been accounted for and handled similarly to the table B in the inner joins section 414. Contrarily, if table B were specified as an outer join, the query on table B and the associated bitwise AND 416 would be omitted. In this case, the results of the bitwise AND 412 would be passed directly on as the matching join bitset 416.

In accordance with one embodiment, a composite join can be specified using the following general syntax:

---
COMPOSITEJOIN(<userquery>, FROM(<rootquery>), INNER|OUTER<clause- query>[, INNER|OUTER<clause-query>], on=<joinfield>)

---

In this syntax, the <userquery>, the <rootquery>, and each <clause-query> can be any valid query that can be processed by the search engine 103 to produce matching search engine records, which may be also referred to as "documents." Certain formations of these queries, however, more effectively take advantage of the benefits and efficiencies of a composite join.

The <userquery> preferably consists of one or more unitary queries optionally operated upon by one or more instances of the Boolean operators AND, OR and NOT. The unitary queries can be terms or phrases, where the terms can be single words or character strings, such as "dog" and the phrases can be any sequence of characters denoted by start and end characters, such as the double quotes as in "Labrador retriever." The unitary queries, however, can also be any valid search engine query other than just a term or phrase. In accordance with one embodiment, for unitary queries that are not terms or phrases, the search engine will not attempt to further parse them, placing them directly into leaf nodes in the Boolean query tree to be executed against the search index 104.

The <rootquery> and <clause-query> preferably each consist of a "table:" query that identifies documents associated with a particular relational database table indexed in the search engine index 104. The unitary queries of the <userquery> query are applied against all of these queries individually. The matching documents produced by the composite join will all be from the <rootquery> query. The specification of INNER preceding a <clause-query> specifies that a corresponding record matched on the <joinfield> needs to be present in the documents produced by the <clause-query> query. In the case of OUTER, no corresponding record need be present. The <joinfield> identifies a join field upon which the results of the <rootquery> and the one or more <clause-query> queries are matched. In accordance with one embodiment, one or more OUTER<clause-query> queries may produce documents without a <joinfield>, in which case the documents will be effectively ignored by the composite join.

Figure 5:
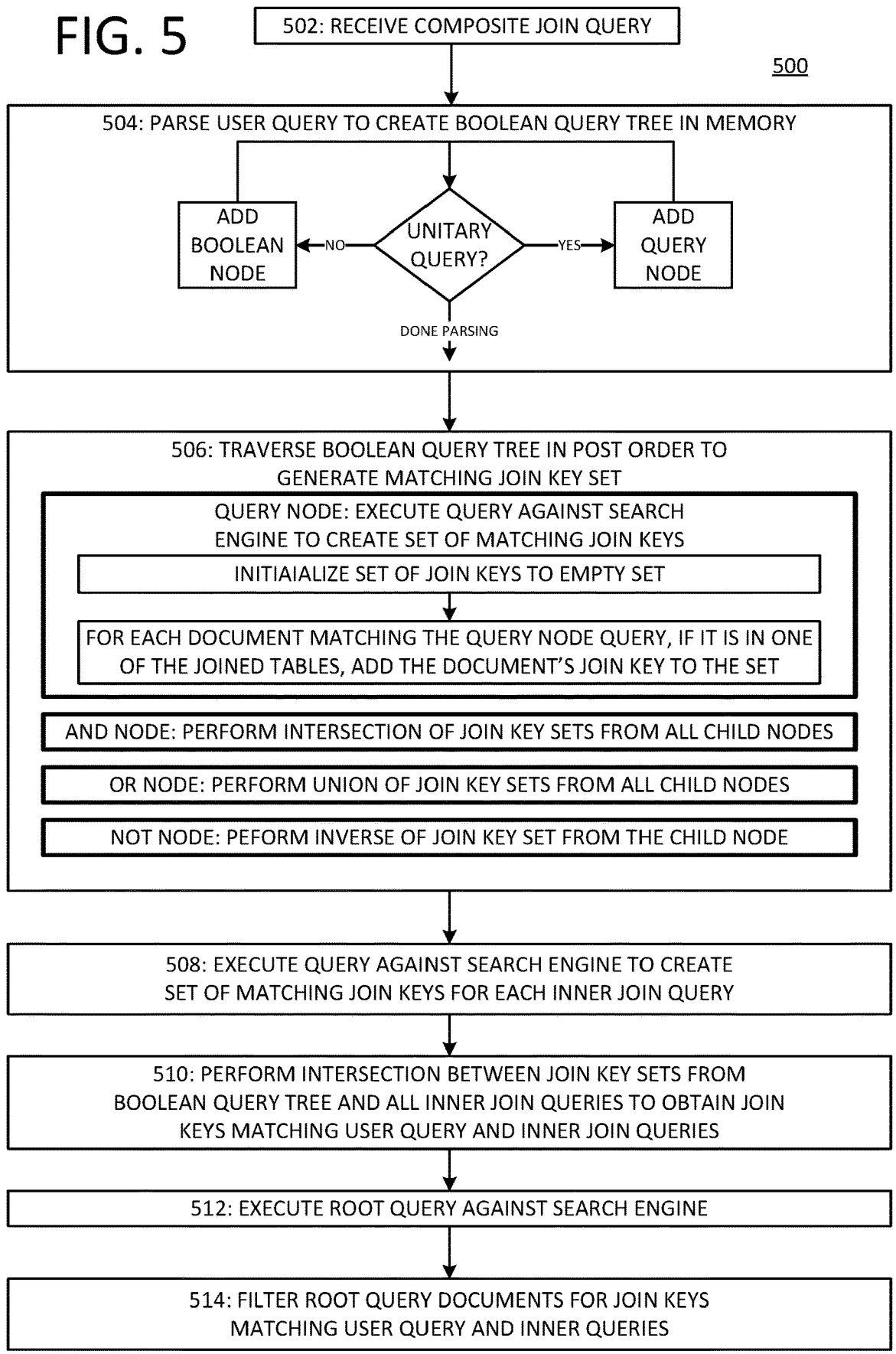
FIG. 5 is a diagram showing an example implementation of a composite join in accordance with one embodiment.

Referring to FIG. 5, a process 500 for performing a composite join query will now be explained. At a step 502 the system 100 receives a composite join query. At a step 504, the system parses the user query to create a Boolean query tree in memory. In parsing the user query, the system the system processes the query, adding Boolean nodes to the tree when it encounters AND, OR or NOT operations, and adding query nodes when it encounters unitary queries until the user query has been completely parsed.

At a step 506, the system traverses the Boolean query tree in "post order" to generate a matching key set. For each query node that the system encounters, the search engine executes a query to create a set of matching join keys. For each AND node, the system performs an intersection of the join key sets from all child nodes. For each OR node, the system performs a union of all join key sets from all child nodes. For each NOT node, the system performs an inverse of the join key set of its child node.

In generating the set of matching join keys for a query node, the search engine initializes a set of join keys to an empty set. Then for each document matching the query node query, if the document is in one of the joined tables (queries), the document's join key is added to the set of matching join keys. If the document does not have a join key or if the document is not in one of the joined tables, the document is ignored. After all documents matching the query have been processed, the set of matching join keys is provided as the result of the query node. In one embodiment, the set of join keys is represented by a join key bitset, initialized to zero, and document matches are logged by setting bits corresponding to the documents' join keys within the bitset. AND, OR and NOT operations are handled using bitwise operations upon child bitsets.

At a step 508, the system executes a query against the search engine index to create a set of matching join keys for each inner join query, if any, specified in the composite query. In one embodiment, the matching join keys for each inner join query are represented by a bitset. At a step 510 the system performs an intersection between the join key sets from the Boolean query tree and all of the inner join queries to obtain a result set of join keys matching the user query and the inner join queries. If no inner join queries are specified, steps 508 and 510 can be omitted.

At a step 512, the system executes a root query against the search engine index to obtain a set of documents matching the root query. At a step 514, the system filters the root query documents for join keys matching the user query and the inner join queries. The result of the step 514 is a set of documents responsive to the inner join query.

In accordance with one embodiment, a set of matching join keys is modeled as a bitset to make efficient use of memory and to simplify the computation of logical operations. In order to model string join fields as a bitset, a mapping is used to map a join key to a bitset index. Each unique join key in a specified join field is mapped to a bitset index. Generally, the size of the bitset will be equal to the number of unique join keys in the specified join field. In accordance with one embodiment, a join key is mapped to its ordinal index in a sorted set of all unique join keys. Integer join fields can be mapped directly using their values to bitset index positions. In this case, the size of the bitset will be equal to the value of the largest join key. This integer-based mapping can result in more sparse bitsets and may take more space than the string approach, but it can avoid an extra layer of join mapping indirection.

Figure 6:
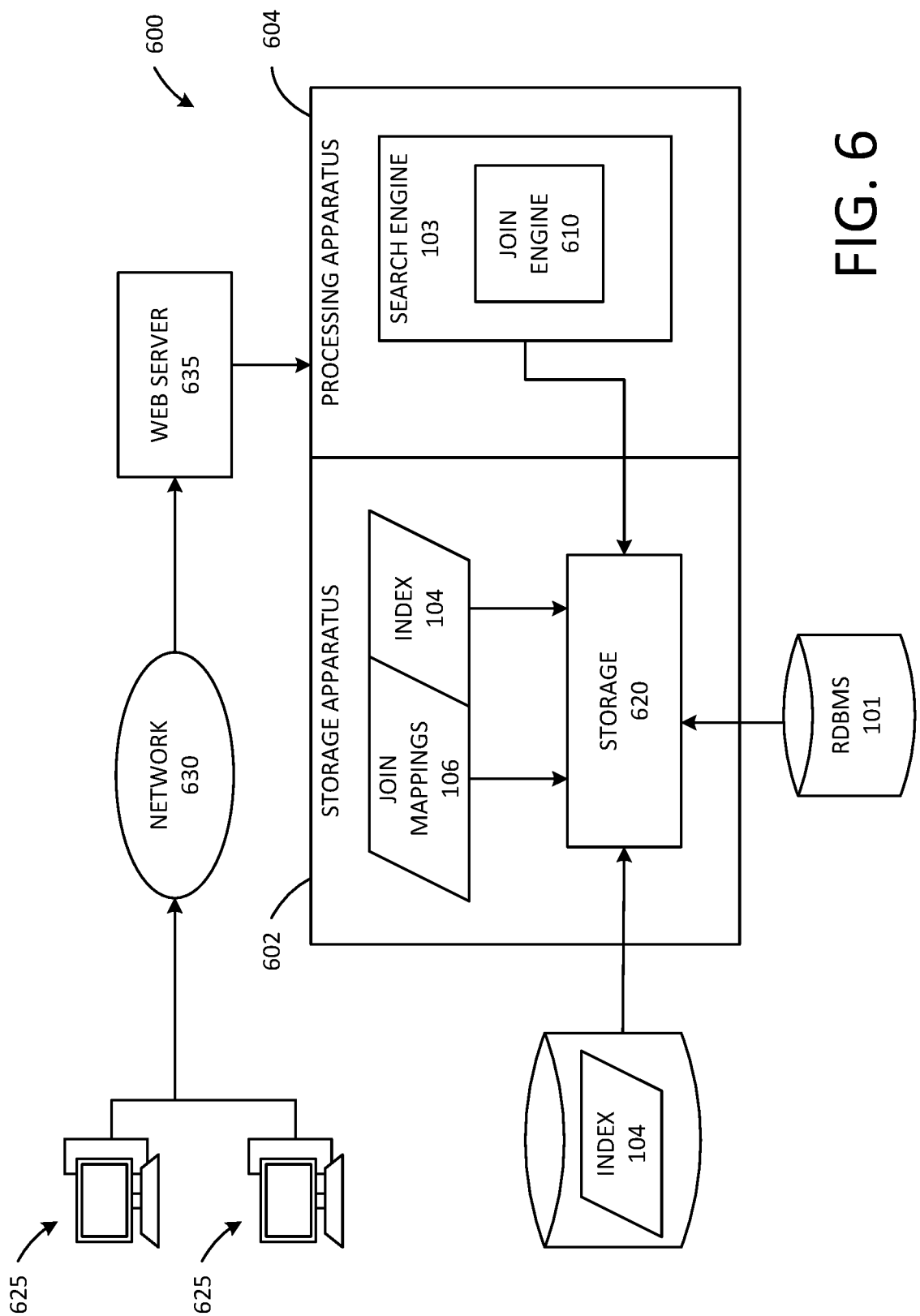
FIG. 6 is a diagram of a system in accordance with one embodiment.

FIG. 6 illustrates a system 600 in accordance with one embodiment. The system 600 includes both a storage apparatus 602 and a processing apparatus 604. The processing apparatus includes one or more computers or computer processors. The processing apparatus 604 preferably provides a platform for the operation of the search engine 103. The processing apparatus 604 provides the functional operations of system 600, including the creation of search-engine indices and join mappings, and the processing of search engine queries against the indices. The storage apparatus 602 includes storage 620 that provides storage (preferably volatile and non-volatile) for indices and documents.

The search engine 103, which executes in a computer memory 704 or 706 (FIG. 7), receives and executes queries, retrieves record-based data from tables in a relational database 101, and creates search-engine indices as described above. The search engine 103 can use or incorporate a join engine 610 that performs set operations on query results. The set operations can include, for example, bitwise logical operations to combine query results sets.

Storage 620 may manage the storage of indices 104 and join mappings 106. For example, the system 600 may determine that certain indices are large and accessed infrequently, and therefore are better placed on disk, whereas other indices and/or join mappings may benefit from being placed in volatile memory (e.g. RAM) for quicker and more frequent usage. The join mappings 106 may be stored with and as part of the index 104, or they may be stored separately.

In practice, the system 600 may be implemented as part of or a module within a larger application, including, for example, web-based applications that utilize conventional search engine interfaces. In such instances, multiple clients 625 submit queries over a network 630. In one embodiment, the queries are received at a web server 635, and passed on to the system 600 for processing. Results may then be integrated into other application pages as presented to the clients 625.

The clients 625 may be implemented as software running on a personal computer, terminal, network computer, set top box, game player, mobile device, wireless device, personal digital assistant, media player, information appliance, workstation, minicomputer, mainframe computer or any other device with computing functionality.

Examples of the relational database 101 that may be used to support the system 600 include the MySQL Database Server by Sun Microsystems, the ORACLE Database Server, or the SQLServer Database Server by Microsoft.

The foregoing description is an example implementation of a computer system. Such a computer system is implemented using one or more general purpose computers, such as client computers, server computers and database computers, which are programmed to implement the functionality such as described in the example implementation(s).

Figure 7:
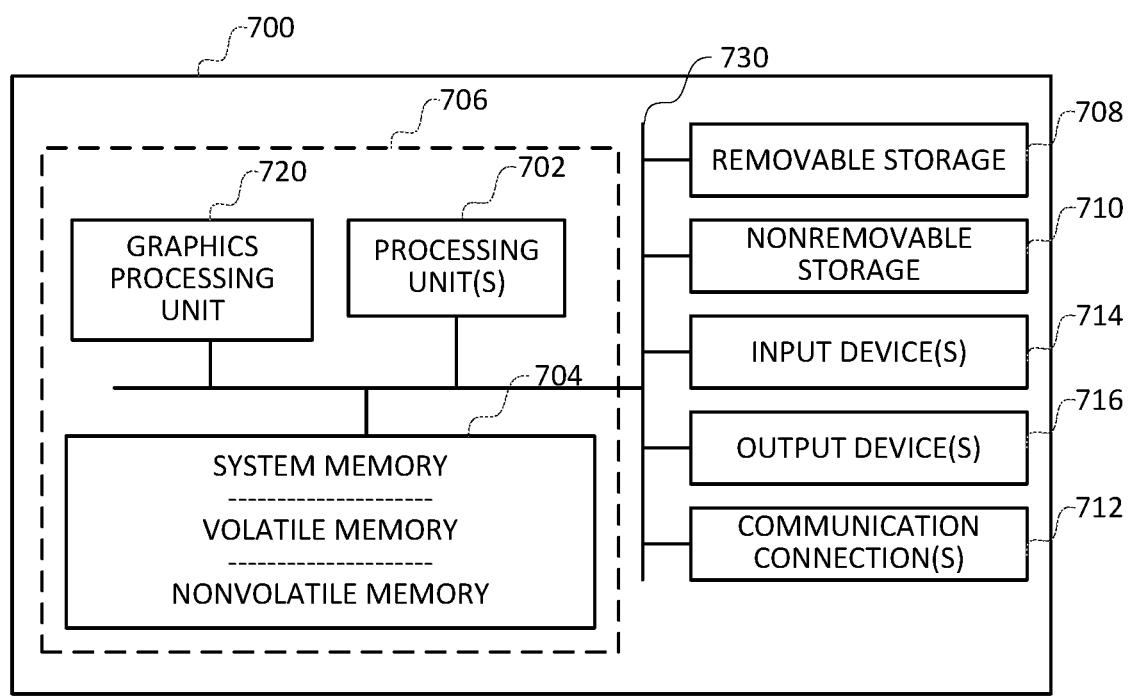
FIG. 7 is a block diagram of an example computer.

FIG. 7 is a block diagram of a general purpose computer with computer programs providing instructions to be executed by a processor in the general purpose computer. Computer programs on a general purpose computer generally include an operating system and applications. The operating system is a computer program running on the computer that manages access to various resources of the computer by the applications and the operating system. The various resources generally include memory, storage, communication interfaces, input devices and output devices.

Examples of such general purpose computers include, but are not limited to, larger computer systems such as server computers, database computers, desktop computers, laptop and notebook computers, as well as mobile or handheld computing devices, such as a tablet computer, hand held computer, smart phone, media player, personal data assistant, audio and/or video recorder, or wearable computing device.

With reference to FIG. 7, an example computer 700 includes at least one processing unit 702 and memory 704. The computer can have multiple processing units 702 and multiple devices implementing the memory 704. A processing unit 702 can include one or more processing cores (not shown) that operate independently of each other. Additional co-processing units, such as graphics processing unit 720, also can be present in the computer. The memory 704 may include volatile devices (such as dynamic random access memory (DRAM) or other random access memory device), and non-volatile devices (such as a read-only memory, flash memory, and the like) or some combination of the two. This configuration of memory is illustrated in FIG. 7 by dashed line 706. The computer 700 may include additional storage (removable and/or non-removable) including, but not limited to, magnetically-recorded or optically-recorded disks or tape. Such additional storage is illustrated in FIG. 7 by removable storage 708 and non-removable storage 710. The various components in FIG. 7 are generally interconnected by an interconnection mechanism, such as one or more buses 730.

A computer storage medium is any medium in which data can be stored in and retrieved from addressable physical storage locations by the computer. Computer storage media includes volatile and nonvolatile memory devices, and removable and non-removable storage media. Memory 704 and 706, removable storage 708 and non-removable storage 710 are all examples of computer storage media. Some examples of computer storage media are RAM, ROM, EEPROM, flash memory or other memory technology, CD-ROM, digital versatile disks (DVD) or other optically or magneto-optically recorded storage device, magnetic cassettes, magnetic tape, magnetic disk storage or other magnetic storage devices. Computer storage media and communication media are mutually exclusive categories of media.

The computer 700 may also include communications connection(s) 712 that allow the computer to communicate with other devices over a communication medium. Communication media typically transmit computer program instructions, data structures, program modules or other data over a wired or wireless substance by propagating a modulated data signal such as a carrier wave or other transport mechanism over the substance. The term "modulated data signal" means a signal that has one or more of its characteristics set or changed in such a manner as to encode information in the signal, thereby changing the configuration or state of the receiving device of the signal. By way of example, and not limitation, communication media includes wired media such as a wired network or direct-wired connection, and wireless media include any non-wired communication media that allows propagation of signals, such as acoustic, electromagnetic, electrical, optical, infrared, radio frequency and other signals. Communications connections 712 are devices, such as a network interface or radio transmitter, that interface with the communication media to transmit data over and receive data from signals propagated through communication media.

The communications connections can include one or more radio transmitters for telephonic communications over cellular telephone networks, and/or a wireless communication interface for wireless connection to a computer network. For example, a cellular connection, a WiFi connection, a Bluetooth connection, and other connections may be present in the computer. Such connections support communication with other devices, such as to support voice or data communications.

The computer 700 may have various input device(s) 714 such as a various pointer (whether single pointer or multi-pointer) devices, such as a mouse, tablet and pen, touchpad and other touch-based input devices, image input devices, such as still and motion cameras, audio input devices, such as a microphone, and various sensors, such as accelerometers, thermometers and the like, and so on. Output device(s) 716 such as a display, speakers, printers, and so on, also may be included. All of these devices are well known in the art and need not be discussed at length here.

The various storage 710, communication connections 712, output devices 716 and input devices 714 can be integrated within a housing of the computer, or can be connected through various input/output interface devices on the computer, in which case the reference numbers 710, 712, 714 and 716 can indicate either the interface for connection to a device or the device itself as the case may be.

An operating system of the computer typically includes computer programs, commonly called drivers, that manage access to the various storage 710, communication connections 712, output devices 716 and input devices 714. Such access generally includes managing inputs from and outputs to these devices. In the case of communication connections, the operating system also may include one or more computer programs for implementing communication protocols used to communicate information between computers and devices through the communication connections 712.

Any of the foregoing aspects may be embodied as a computer system, as any individual component of such a computer system, as a process performed by such a computer system or any individual component of such a computer system, or as an article of manufacture including computer storage in which computer program instructions are stored and which, when processed by one or more computers, configure the one or more computers to provide such a computer system or any individual component of such a computer system.

Each component (which also may be called a "module" or "engine" or the like), of a computer system such as described herein, and which operates on one or more computers, can be implemented using the one or more processing units of the computer and one or more computer programs processed by the one or more processing units. A computer program includes computer-executable instructions and/or computer-interpreted instructions, such as program modules, which instructions are processed by one or more processing units in the computer. Generally, such instructions define routines, programs, objects, components, data structures, and so on, that, when processed by a processing unit, instruct the processing unit to perform operations on data or configure the processor or computer to implement various components or data structures.

Aspects of Certain Embodiments

In one aspect, a system includes: a processing apparatus comprising one or more computer processors; a storage apparatus comprising computer memory and storing: a search engine index including searchable content for a plurality of documents, wherein each document is associated with a unique identifier, with a table, and with a join key based upon which the document can be associated with other documents having an identical join key, a join mapping that maps between documents and join keys for a join field, and a bitset index that maps ordinal locations in a join bitset to join keys for a join field; and a search engine operating on the one or more processors, wherein the search engine is configured to execute queries against the search engine index, wherein the processing apparatus is configured to: receive a composite join query comprising a specification of a user query, a specification of a root table, a specification of a join table, and a specification of a join field, wherein the specification of the user query comprises one or more Boolean operations applied to one or more unitary queries; for each of the unitary queries, execute the unitary query against the search engine index using the search engine, filter results of the execution of the unitary query for documents contained in at least one of the root table and the join table, and identify join keys from the join field that correspond to the filtered results by setting bits in a join bitset according to the bitset index; for each of the Boolean operations, apply the Boolean operation according to the user query to one or more join bitsets, wherein the one or more join bitsets are obtained from executed unitary queries, from other applied Boolean operations or from both, to create a join bitset, until all of the one or more Boolean operations have been applied; store the join bitset created from an application of a last one of the one or more Boolean operations; retrieve a set of documents from the root table; filter the set of documents from the root table to obtain a set of documents having join keys that match join keys identified by the stored join bitset; and provide the filtered set of documents as a result for the composite join query.

In one aspect, the system can be implemented wherein the join table is identified as an inner join table in the composite join query, and wherein the processing apparatus is further configured to: retrieve a set of documents from the join table; identify join keys from the join field that correspond to the set of documents retrieved from the join table; aggregate the identified join keys from the join table by setting bits in an inner join bitset according to the bitset index; and update the stored join bitset by performing a bitwise AND on the stored join bitset and the inner join bitset.

In one aspect, the system can be implemented wherein the filtering of the set of documents from the root table to obtain a set of documents having join keys that match join keys identified by the stored bitset index is performed by mapping a join key of each of the set of documents from the root table to the join bitset using the bitset index and checking a value of a bit corresponding to the join key.

In one aspect, the system can be implemented wherein the processing apparatus is further configured to create a set of matching join keys by mapping the stored join bitset using the bitset index to join keys, and wherein the set of documents from the root table is filtered using the set of matching join keys.

In one aspect, the system can be implemented wherein the processing apparatus is further configured to: parse the user query to create a Boolean query tree in the computer memory, wherein each of the unitary queries is associated with a leaf node of the tree and wherein each of the Boolean operations is associated with a non-leaf node of the tree; and wherein the one or more unitary queries are applied and the one or more Boolean operations are executed in accordance with a traversal of the Boolean query tree.

In one aspect, the system can be implemented wherein the traversal of the query tree is performed in post order.

In one aspect, the system can be implemented wherein the join table is identified as an outer join table.

In one aspect, the system can be implemented wherein at least one of the root table and the join table is specified by a query.

In one aspect, the system can be implemented wherein one of the root table and the join table comprises content for a set of searchable documents and another of the root table and the join table comprises metadata for the set of searchable documents, and wherein the root table and the join table are associated through the join field specified in the composite query.

In one aspect, the system can be implemented wherein the Boolean operations are selected from a group consisting of AND, OR and NOT.

In one aspect, the system can be implemented wherein each of the one or more unitary queries is independently executable by the search engine.

In one aspect, the system can be implemented wherein the processing apparatus is further configured to index records from a plurality of tables of a relational database in the search engine index, and wherein the specification root table and the specification of the join table together identify the plurality of tables.

In one aspect, the system can be implemented wherein the specification of the root table and the specification of the join table are separate from the specification of the user query in the composite join query.

In one aspect, the system can be implemented wherein the Boolean operations specified in the user query are applied using bitwise logical operations on the join bitsets.

In one aspect, a method includes: storing, by a processing apparatus comprising one or more computer processors and on a storage apparatus comprising computer memory: a search engine index including searchable content for a plurality of documents, wherein each document is associated with a unique identifier, with a table, and with a join key based upon which the document can be associated with other documents having an identical join key, a join mapping that maps between documents and join keys for a join field, and a bitset index that maps ordinal locations in a join bitset to join keys for a join field; the processing apparatus operating a search engine to execute queries against the search engine index; the processing apparatus receiving a composite join query comprising a specification of a user query, a specification of a root table, a specification of a join table, and a specification of a join field, wherein the specification of the user query comprises one or more Boolean operations applied to one or more unitary queries; for each of the unitary queries, the processing apparatus: executing the unitary query against the search engine index using the search engine, filtering results of the execution of the unitary query for documents contained in at least one of the root table and the join table, and identifying join keys from the join field that correspond to the filtered results by setting bits in a join bitset according to the bitset index; for each of the Boolean operations, the processing apparatus applying the Boolean operation according to the user query to one or more join bitsets, wherein the one or more join bitsets are obtained from executed unitary queries, from other applied Boolean operations or from both, to create a join bitset, until all of the one or more Boolean operations have been applied; the processing apparatus storing the join bitset created from an application of a last one of the one or more Boolean operations; the processing apparatus retrieving a set of documents from the root table; the processing apparatus filtering the set of documents from the root table to obtain a set of documents having join keys that match join keys identified by the stored join bitset; and the processing apparatus providing the filtered set of documents as a result for the composite join query.

In one aspect, a set of one or more non-transitory computer-readable media storing instructions that when executed by a processing apparatus comprising one or more computer processors cause the processing apparatus to: store on a storage apparatus comprising computer memory: a search engine index including searchable content for a plurality of documents, wherein each document is associated with a unique identifier, with a table, and with a join key based upon which the document can be associated with other documents having an identical join key, a join mapping that maps between documents and join keys for a join field, and a bitset index that maps ordinal locations in a join bitset to join keys for a join field; operate a search engine to execute queries against the search engine index; receive a composite join query comprising a specification of a user query, a specification of a root table, a specification of a join table, and a specification of a join field, wherein the specification of the user query comprises one or more Boolean operations applied to one or more unitary queries; for each of the unitary queries: execute the unitary query against the search engine index using the search engine, filter results of the execution of the unitary query for documents contained in at least one of the root table and the join table, and identify join keys from the join field that correspond to the filtered results by setting bits in a join bitset according to the bitset index; for each of the Boolean operations, apply the Boolean operation according to the user query to one or more join bitsets, wherein the one or more join bitsets are obtained from executed unitary queries, from other applied Boolean operations or from both, to create a join bitset, until all of the one or more Boolean operations have been applied; store the join bitset created from an application of a last one of the one or more Boolean operations; retrieve a set of documents from the root table; filter the set of documents from the root table to obtain a set of documents having join keys that match join keys identified by the stored join bitset; and provide the filtered set of documents as a result for the composite join query.

In one aspect, a method, performed by a system comprising a storage apparatus and a processing apparatus having one or more computer processors, includes: storing, on the storage apparatus, searchable content for a plurality of records, wherein each record is associated with a unique identifier, with a table containing the record, and with a join key based upon which the record can be associated with other records having an identical join key; the processing apparatus receiving a composite join query comprising a specification of a user query, a specification of a plurality of join tables, and a specification of a join field, wherein the specification of the user query comprises one or more Boolean operations applied to one or more unitary queries; for each of the unitary queries, the processing apparatus: executing the unitary query against the searchable content, filtering results of the execution for records contained in any of the plurality of join tables, identifying join keys from the join field that correspond to the filtered results, and aggregating the identified join keys in a set of matching join keys on the join field; for each of the Boolean operations, the processing apparatus applying the Boolean operation according to the user query to one or more sets of matching join keys, wherein the one or more sets of matching join keys are obtained from executed unitary queries, from other applied Boolean operations or from both, to create a set of matching join keys, until all of the one or more Boolean operations have been applied; and the processing apparatus storing the set of matching join keys created from an application of a last one of the one or more Boolean operations.

In one aspect, the method can be implemented wherein one of the join tables is specified by an inner join table query, and wherein the method further includes: executing the inner join table query against the search engine index to create a set of matching join keys on the join field; and updating the stored set of matching join keys by performing an intersection between the stored set of matching join keys and the set of matching join keys from the inner join table query.

In one aspect, the method can be implemented wherein one of the join tables is specified by a root table query, and wherein the method further includes: executing the root table query against the search engine index to obtain a set of root table query records; filtering the root table query records to obtain a set of records matching the stored set of matching join keys; and providing the set of records as a result for the composite join query.

In one aspect, the method further includes, parsing the user query to create a Boolean query tree in a system memory, wherein each of the unitary queries are associated with a leaf node of the tree and wherein each of the Boolean operations are associated with a non-leaf node of the tree, wherein the one or more unitary queries are applied and the one or more Boolean operations are executed in accordance with a traversal of the Boolean query tree.

In one aspect, the method can be implemented wherein the traversal of the query tree is performed in post order.

In one aspect, the method can be implemented wherein the plurality of join tables are specified by a root table query and an outer join table query.

In one aspect, the method can be implemented wherein the plurality of join tables are specified by a query to a table including content for a set of searchable records and a query to a related table containing metadata for the set of searchable records, wherein the plurality of join tables are associated through the join field specified in the composite query.

In one aspect, the method can be implemented wherein the Boolean operations are selected from a group consisting of AND, OR and NOT.

In one aspect, the method can be implemented wherein each of the one or more unitary queries is independently executable by the search engine.

In one aspect, the method further includes creating the plurality of join tables by indexing records from a plurality of tables of a relational database in a search engine index.

In one aspect, the method can be implemented wherein the specification of the plurality of join tables is separate from the specification of the user query.

In one aspect, the method further includes: establishing a join mapping for the join field, wherein the join mapping associates records with join keys from the join field; and using the join mapping to identify join keys from the join field that correspond to the filtered results.

In one aspect, the method further includes: establishing a bitset index that associates locations in a join bitset with join keys, and maintaining sets of matching join keys by setting bits associated with the matching join keys in a join bitset according to the bitset index.

In one aspect, the method can be implemented wherein the Boolean operations specified in the user query are applied using bitwise logical operations on join bitsets maintaining the matching join keys.

In one aspect, a system includes: a processing apparatus comprising one or more computer processors; a storage apparatus comprising computer memory and storing: a search engine index including searchable content for a plurality of documents, wherein each document is associated in the index with a unique identifier, with a table containing the document, and with a join key based upon which the document can be associated with other documents having an identical join key; and a search engine operating on the one or more processors, wherein the search engine is configured to: receive a composite join query comprising a specification of a user query, a specification of a plurality of join tables, and a specification of a join field, wherein the specification of the user query comprises one or more Boolean operations applied to one or more unitary queries; for each of the unitary queries, execute the unitary query against the search engine index using the search engine, filter results of the execution of the unitary query for documents contained in any of the plurality of join tables, identify join keys from the join field that correspond to the filtered results, and aggregate the identified join keys in a set of matching join keys; for each of the Boolean operations, apply the Boolean operation according to the user query to one or more sets of matching join keys, wherein the one or more sets of matching join keys are obtained from executed unitary queries, from other applied Boolean operations or from both, to create a set of matching join keys, until all of the one or more Boolean operations have been applied; and store the set of matching join keys created from an application of a last one of the one or more Boolean operations.

In one aspect, the system can be implemented wherein: the storage apparatus stores a bitset index that associates locations in a join bitset with join keys, and the processing apparatus maintains sets of matching join keys by setting bits associated with the matching join keys in a join bitset according to the bitset index.

In one aspect, the system can be implemented wherein the Boolean operations specified in the user query are applied using bitwise logical operations on join bitsets maintaining the matching join keys.

In one aspect, the system can be implemented wherein one of the join tables is specified by a root table query, and wherein the search engine is further configured to: execute the root table query against the search engine index to obtain a set of root table query records; filter the root table query records to obtain a set of records matching the stored set of matching join keys; and provide the set of records as a result for the composite join query.

In one aspect, a method, performed by a system comprising a search engine accessing a search engine index, includes: receiving a composite join query comprising a specification of a user query, a specification of a plurality of join table queries, and a specification of a join field, wherein the specification of the user query comprises one or more Boolean operations applied to one or more unitary queries; for each of the unitary queries, executing the unitary query against the search engine index, filtering results of the execution for documents contained in any of the plurality of join table queries, identifying join keys from the join field that correspond to the filtered results, and aggregating the identified join keys in a set of matching join keys on the join field; for each of the Boolean operations, applying the Boolean operation according to the user query to one or more sets of matching join keys, wherein the one or more sets of matching join keys are obtained from executed unitary queries, from other applied Boolean operations or from both, to create a set of matching join keys, until all of the one or more Boolean operations have been applied; and storing the set of matching join keys created from an application of a last one of the one or more Boolean operations.

In one aspect, the method can be implemented wherein the plurality of join table queries comprise a root table query, and wherein the method further includes: executing the root table query against the search engine index to obtain a set of root table query documents; filtering the root table query documents to obtain a set of documents matching the stored set of matching join keys; and providing the set of documents as a result for the composite join query.

In one aspect, the method can be implemented wherein the plurality of join table queries comprise an inner join table query, and wherein the method further includes: executing the inner join table query against the search engine index to create a set of matching join keys on the join field; and updating the stored set of matching join keys by performing an intersection between the stored set of matching join keys and the set of matching join keys from the inner join table query.

In one aspect, the method further includes, parsing the user query to create a Boolean query tree in a system memory, wherein each of the unitary queries are associated with a leaf node of the tree, wherein each of the Boolean operations are associated with a non-leaf node of the tree, and wherein the one or more unitary queries are applied and the one or more Boolean operations are executed in accordance with a traversal of the Boolean query tree.

In one aspect, the method can be implemented wherein the traversal of the query tree is performed in post order.

In one aspect, the method can be implemented wherein the plurality of join table queries comprise a root table query and an outer join table query.

In one aspect, the method can be implemented wherein the plurality of join table queries comprise a query to a table including content for a set of searchable documents and a query to a related table containing metadata for the set of searchable documents, wherein the tables are associated through the join field specified in the composite query.

In one aspect, the method can be implemented wherein the Boolean operations are selected from a group consisting of AND, OR and NOT.

In one aspect, the method can be implemented wherein each of the one or more unitary queries is independently executable by the search engine.

In one aspect, the method further includes indexing records from a plurality of tables of a relational database in the search engine index, wherein the plurality of join table queries identify the plurality of tables.

In one aspect, the method can be implemented wherein the specification of the plurality of join table queries is separate from the specification of the user query.

In one aspect, the method further includes: establishing a join mapping for the join field, wherein the join mapping associates documents with join keys from the join field; and using the join mapping to identify join keys from the join field that correspond to the filtered results.

In one aspect, the method further includes, establishing a bitset index that associates locations in a join bitset with join keys, with documents or with both, and maintaining sets of matching join keys by setting bits associated with the matching join keys in a join bitset according to the bitset index.

In one aspect, the method can be implemented wherein the Boolean operations specified in the user query are applied using bitwise logical operations on join bitsets maintaining the matching join keys.

It should be understood that the subject matter defined in the appended claims is not necessarily limited to the specific implementations described above. The specific implementations described above are disclosed as examples only.

The invention claimed is:

1. A system, comprising:
a processor; and
a memory, accessible by the processor, the memory storing instructions that, when executed by the processor, cause the processor to perform actions comprising:
receiving a composite join query comprising:
one or more unitary queries;
one or more Boolean operations applied to the one or more unitary queries;
an identification of a plurality of join tables of a plurality of relational databases; and
an identification of a join field;
generating a Boolean tree based on the composite join query;
traversing the generated Boolean tree to generate a plurality of matching join key sets, wherein each respective matching join key set of the plurality of matching join key sets comprises one or more join keys of one or more respective matching documents from the plurality of join tables for a respective query node of the Boolean tree;
filtering the matching documents to remove matching documents with join keys that do not match the one or more unitary queries of the composite join query; and
providing an identification of the filtered matching documents as results of the composite join query.

2. The system of claim 1, wherein generating the Boolean tree based on the composite join query comprises:
parsing the composite join query;
adding a new Boolean node to the Boolean tree for each of the one or more Boolean operations of the composite join query; and
adding a new query node to the Boolean tree for each of the one or more unitary queries of the composite join query.

3. The system of claim 2, wherein traversing the generated Boolean tree to generate the plurality of matching join key sets comprises:
for each query node of the generated Boolean tree:
executing a query, via a search engine, on the plurality of join tables for each query node of the generated Boolean tree; and
adding, to the respective matching join key set, a join key of each matching document of the plurality of join tables that matches the query of the query node; and
for each Boolean node of the generated tree, performing the respective Boolean operation on the join keys of the respective join key set.

4. The system of claim 3, wherein performing the respective Boolean operation on the join keys of the respective join key set comprises, for each of one or more Boolean AND nodes of the generated tree, performing an intersection of the respective join key sets from one or more child nodes of the respective Boolean AND node.

5. The system of claim 3, wherein performing the respective Boolean operation on the join keys of the respective join key set comprises, for each of one or more Boolean OR nodes of the generated tree, performing a union of the respective join key sets from one or more child nodes of the respective Boolean OR node.

6. The system of claim 3, wherein performing the respective Boolean operation on the join keys of the respective join key set comprises, for each of one or more Boolean NOT nodes of the generated tree, performing an inverse of the respective join key sets from one or more child nodes of the respective Boolean NOT node.

7. The system of claim 1, wherein the identification of the plurality of join tables comprises an inner join table query, and wherein the actions comprise generating a matching inner join key set, comprising:
executing the inner join table query, via a search engine, on the plurality of join tables; and
adding, to the matching inner join key set, one or more inner join keys of each matching document of the plurality of join tables that matches the inner join table query.

8. The system of claim 7, wherein the actions comprise performing an intersection between the plurality of matching join key sets and the matching inner join key set.

9. The system of claim 8, the actions comprising filtering the matching documents to remove matching documents with join keys that do not match the intersected plurality of matching join key sets and the matching inner join key set.

10. A method, comprising:
receiving a composite join query comprising:
one or more unitary queries;
one or more Boolean operations applied to the one or more unitary queries;
an identification of a plurality of join tables of a plurality of relational databases; and
an identification of a join field;
generating a Boolean tree based on the composite join query, comprising:
parsing the composite join query;
adding a new Boolean node to the Boolean tree for each of the one or more Boolean operations of the composite join query; and
adding a new query node to the Boolean tree for each of the one or more unitary queries of the composite join query;
traversing the generated Boolean tree in post order to generate a plurality of matching join key sets, wherein each respective matching join key set of the plurality of matching join key sets comprises one or more join keys of one or more respective matching documents from the plurality of join tables for a respective query node of the Boolean tree;
filtering the matching documents to remove matching documents with join keys that do not match the one or more unitary queries of the composite join query; and
providing an identification of the filtered matching documents as results of the composite join query.

11. The method of claim 10, wherein traversing the generated Boolean tree to generate the plurality of matching join key sets comprises:

for each query node of the generated Boolean tree:
  executing a query, via a search engine, on the plurality of join tables for each query node of the generated Boolean tree; and
  adding, to the respective matching join key set, a join key of each matching document of the plurality of join tables that matches the query of the query node; and for each Boolean node of the generated tree, performing the respective Boolean operation on the join keys of the respective join key set.

12. The method of claim 11, wherein performing the respective Boolean operation on the join keys of the respective join key set comprises:

performing, for each of one or more Boolean AND nodes of the generated tree, an intersection of the respective join key sets from one or more child nodes of the respective Boolean AND node;

performing, for each of one or more Boolean OR nodes of the generated tree, a union of the respective join key sets from one or more child nodes of the respective Boolean OR node; and performing, for each of one or more Boolean NOT nodes of the generated tree, an inverse of the respective join key sets from one or more child nodes of the respective Boolean NOT node.

13. The method of claim 10, wherein the identification of the plurality of join tables comprises an inner join table query, and wherein the actions comprise generating a matching inner join key set, comprising:

executing the inner join table query, via a search engine, on the plurality of join tables; and adding, to the matching inner join key set, one or more inner join keys of each matching document of the plurality of join tables that matches the inner join table query.

14. The method of claim 13, comprising:

performing an intersection between the plurality of matching join key sets and the matching inner join key set; and filtering the matching documents to remove matching documents with join keys that do not match the intersected plurality of matching join key sets and the matching inner join key set.

15. A non-transitory computer readable medium comprising instructions that, when executed by a processor, causes the processor to perform actions comprising:

receiving a composite join query comprising:
  one or more unitary queries;
  one or more Boolean operations applied to the one or more unitary queries;
  an inner join table query comprising an identification of a plurality of join tables of a plurality of relational databases; and
  an identification of a join field;

generating a Boolean tree based on the composite join query;

traversing the generated Boolean tree to generate a plurality of matching join key sets, wherein each respective matching join key set of the plurality of matching join key sets comprises one or more join keys of one or more respective matching documents from the plurality of join tables for a respective query node of the Boolean tree;

generating a matching inner join key set, comprising:
  executing the inner join table query, via a search engine, on the plurality of join tables; and
  adding, to the matching inner join key set, one or more inner join keys of each matching document of the plurality of join tables that matches the inner join table query;

performing an intersection between the plurality of matching join key sets and the matching inner join key set;

filtering the matching documents to remove matching documents with join keys that do not match intersected plurality of matching join key sets and the matching inner join key set; and providing an identification of the filtered matching documents as results of the composite join query.

16. The non-transitory computer readable medium of claim 15, wherein generating the Boolean tree based on the composite join query comprises:

parsing the composite join query;

adding a new Boolean node to the Boolean tree for each of the one or more Boolean operations of the composite join query; and adding a new query node to the Boolean tree for each of the one or more unitary queries of the composite join query.

17. The non-transitory computer readable medium of claim 16, wherein traversing the generated Boolean tree to generate the plurality of matching join key sets comprises:

for each query node of the generated Boolean tree:
  executing a query, via the search engine, on the plurality of join tables for each query node of the generated Boolean tree; and
  adding, to the respective matching join key set, a join key of each matching document of the plurality of join tables that matches the query of the query node; and for each Boolean node of the generated tree, performing the respective Boolean operation on the join keys of the respective join key set.

18. The non-transitory computer readable medium of claim 15, wherein performing the respective Boolean operation on the join keys of the respective join key set comprises, for each of one or more Boolean AND nodes of the generated tree, performing an intersection of the respective join key sets from one or more child nodes of the respective Boolean AND node.

19. The non-transitory computer readable medium of claim 15, wherein performing the respective Boolean operation on the join keys of the respective join key set comprises, for each of one or more Boolean OR nodes of the generated tree, performing a union of the respective join key sets from one or more child nodes of the respective Boolean OR node.

20. The non-transitory computer readable medium of claim 15, wherein performing the respective Boolean operation on the join keys of the respective join key set comprises, for each of one or more Boolean NOT nodes of the generated tree, performing an inverse of the respective join key sets from one or more child nodes of the respective Boolean NOT node.

* * * * *